(12) United States Patent
Mejia et al.

(10) Patent No.: US 6,400,338 B1
(45) Date of Patent: Jun. 4, 2002

(54) PASSIVE INTEGRATED TRANSPONDER TAG WITH UNITARY ANTENNA CORE

(75) Inventors: Ezequiel Mejia, Woodbury; Sean Casey, St. Paul, both of MN (US)

(73) Assignee: Destron-Fearing Corporation, St. Paul, MN (US)

( * ) Notice: Subject to any disclaimer, the term of this patent is extended or adjusted under 35 U.S.C. 154(b) by 0 days.

(21) Appl. No.: 09/480,400

(22) Filed: Jan. 11, 2000

(51) Int. Cl.$^7$ .......................... H01Q 1/400; H01Q 1/270
(52) U.S. Cl. ........................................ 343/873; 343/788
(58) Field of Search ...................... 343/873, 788, 343/784, 702, 787, 744, 742, 718, 719; 257/784; 340/572.1, 571, 572

(56) References Cited

U.S. PATENT DOCUMENTS

| | | | |
|---|---|---|---|
| 5,025,550 A | 6/1991 | Zirbes et al. ................. 29/605 |
| 5,211,129 A | 5/1993 | Taylor et al. .................. 119/3 |
| 5,223,851 A | * 6/1993 | Hadden et al. ............. 343/873 |
| 5,281,855 A | 1/1994 | Hadden et al. ............. 257/784 |
| 5,963,132 A | * 10/1999 | Yoakum .................. 340/752.1 |

* cited by examiner

*Primary Examiner*—Don Wong
*Assistant Examiner*—Chuc Tran
(74) *Attorney, Agent, or Firm*—Stroock & Stroock & Lavan LLP

(57) ABSTRACT

A passive integrated transponder (PIT) tag comprising an integrated circuit and a unitary core is described. The unitary core comprises a coil-forming portion proximate one end thereof and an integrated circuit support portion proximate an opposite end thereof. The integrated circuit support portion extends beneath and supports the integrated circuit.

23 Claims, 4 Drawing Sheets

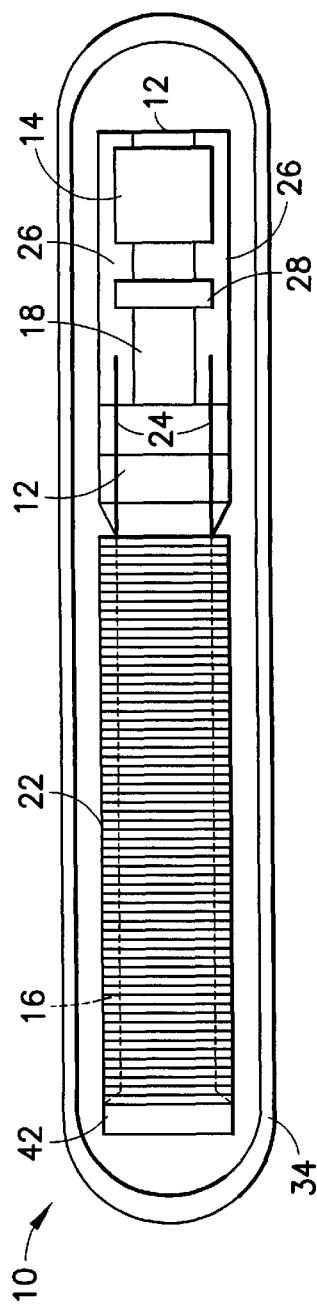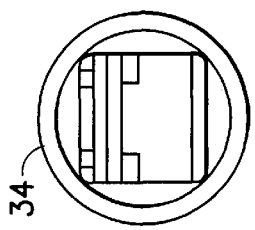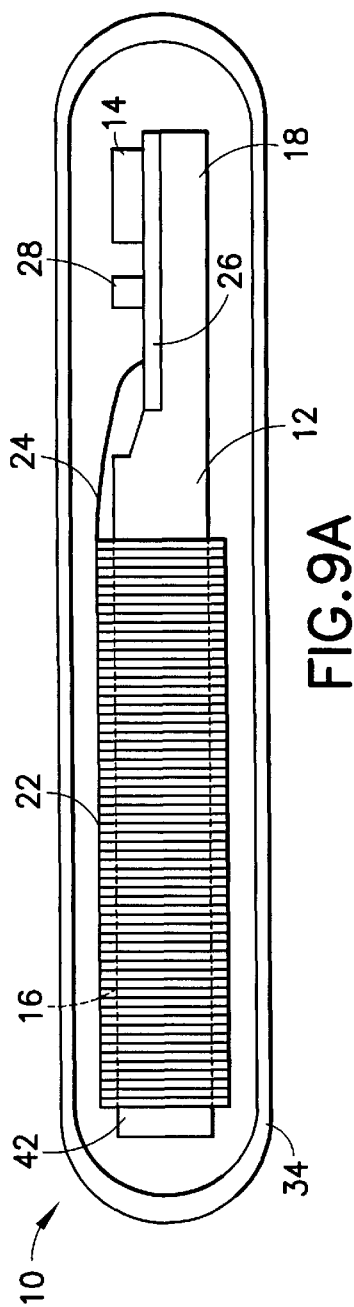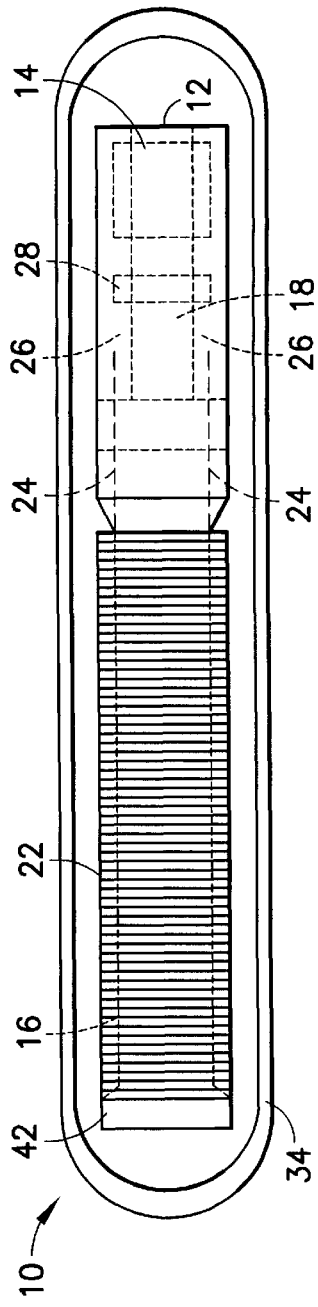

PASSIVE INTEGRATED TRANSPONDER TAG WITH UNITARY ANTENNA CORE

FIELD OF THE INVENTION

This invention relates to the field of passive integrated transponder tags, and specifically to a passive integrated transponder tag having a unitary antenna core.

BACKGROUND OF THE INVENTION

The use of Passive Integrated Transponder (PIT) tags which may be embedded in or attached to items to be tracked and accounted for has been widespread for some time. These commonly known PIT tag systems generally comprise one or more antenna coils so positioned as to generate a field of radiated electromagnetic energy within which the tagged item or object must pass. As generally deployed, such systems are used to track and/or count animals within which a PIT tag has been subcutaneously embedded or externally affixed.

As the PIT tag traverses the radiated field of electromagnetic energy, it is energized in a manner known in the art. The PIT tag uses this energy—which is typically stored in a capacitive element—to power a transmission circuit which emits a unique PIT tag identification signal that is detected by the aforementioned antenna element. The identification signal detected by the antenna element is then transmitted to remote processing equipment which decodes the detected signal and uses this decoded information for the purposes of counting, tracking or otherwise maintaining records pertinent to the population of items or animals being tracked by said system.

PIT tags, or transponders, of the type used for object identification, and particularly those which are implantable into living creatures, such as livestock, are well known in the art. Most such PIT tags comprise a coil, which serves as a receiving antenna, for receiving interrogation signals to activate the transponder and for receiving power for its operations. The same antenna is used to transmit the identification signal. An integrated circuit, housed in an art-recognized integrated circuit package, is also provided for performing the circuit functions, including detection of the interrogation signal, conversion of the received signal to DC for powering of the transmitter operations, storage and provision of an identification code, generation of the transmission signal frequency, and modulation of the transmitted signal in accordance with the code and its transmission. The circuit divides the interrogation signal frequency by plural divisors to generate two frequencies which are used to provide a frequency-shift-keyed output signal, the transmission frequency varying in accordance with the stored identification signal. The transponder may be encapsulated in glass or a similarly durable material, as a matter of design choice. It may be supplied together with a disposable cannula for convenient syringe implantation into an animal. Together with essentially conventional interrogator and data storage equipment, a complete animal monitoring system can be provided, suitable for monitoring migratory movements of wild animals as well as laboratory animals, pets and livestock.

PIT tags of the type used for object identification, and particularly those which are implantable into living creatures, such as livestock, are very small and have inherent size restrictions that must be considered in their design and manufacture. Over the years, different size PIT tags were tested and used throughout the industry. Eventually, in the market for animal identification through implantable PIT tags especially, the size became more standardized. Today, one of the more standard sizes in this field is a PIT tag 12 mm long and 2.07 mm wide. Most of the major studies in companion animals and fish applications were carried out with such sized PIT tags. Given such a size standardization, a need in the art has arisen to increase the operating range or performance of the PIT tag without increasing its size.

As described in the prior art, PIT tags have generally been constructed in one of two ways. In the first, the PIT tags are built in subassemblies, such as one subassembly comprising the antenna having loose wire leads and another subassembly comprising the Integrated Circuit (IC) and a capacitor mounted on a Printed Circuit Board (PCB). See, for example, U.S. Pat. No. 5,211,129, which is assigned to the same assignee as the present application, and which is hereby incorporated by reference. The two subassemblies are then electrically and mechanically connected. This approach does provide some advantages, including the use of standard manufacturing machinery as well as the ability to permit design changes quickly and easily during the manufacturing process. However, this approach also has some disadvantages, such as it tends to be labor intensive because much of the assembly of the subcomponents must be done manually, for example, connecting the antenna leads to the IC, and the entire manufacturing process tends to be costly and timely due in part to the number of manufacturing steps involved.

In a second approach, the antenna leads are directly connected to the IC during the manufacturing process. See for example, U.S. Pat. Nos. 5,223,851 and 5,281,855, each of which is incorporated herein by reference. One advantage of such an approach is that the manufacturing process is more fully automated, thus saving time. However, due in part to the small size of the components involved, the machines that directly connect the antenna leads to the IC tend to be expensive and often need maintenance or supervision by a dedicated expert. Further, another disadvantage of this system is that because the antenna leads are connected directly to the IC, it is difficult and expensive to substitute alternate types of ICs or capacitors on the final PIT tag without significant changes in the manufacturing assembly process. Nonetheless, in the prior art the core and IC support subassemblies are not unitary but rather are multi-part assemblies made integral by joining the parts together.

It would therefore be advantageous for a PIT tag to be developed which would alleviate shortcomings of the prior art. The present invention provides a solution.

SUMMARY OF THE INVENTION

The PIT tag of the present invention generally comprises a unitary core that extends substantially the entire length of the PIT tag. As used herein, the term unitary is given its ordinary meaning and means a one-piece core. In a preferred embodiment the unitary core generally comprises a cylindrical portion for receiving the antenna coil at one end and a flattened portion for permitting or housing the electrical connection between the integrated circuit and/or capacitor and the antenna coil at the other end. In a preferred embodiment the flattened portion of the core is formed with an integral pair of metalization layers or pads. With the core so constructed, the leads from the antenna coil can be electrically connected to the metalization layers during the manufacturing process. As discussed herein, it is assumed that the Integrated Circuit (IC) is housed in an art-recognized IC package, thus, unless otherwise specified, the term IC as used herein refers not only to the circuitry but to the IC package and leads typically present with ICs used in conjunction with the PIT technology described herein.

By providing metalization layers on the core itself, the integrated circuit and/or capacitor can be easily electrically connected to the metalization layers in any of a number of art-recognized methods. Once connected to the metalization layers, the integrated circuit is electrically connected to the antenna coil as well. With the core so constructed, the unitary core serves as the support for the integrated circuit and/or capacitor and also permits the electrical connection between the integrated circuit and/or capacitor and the antenna coil to be accomplished in a quicker and less costly manner than that of the prior art.

As one of skill in the art will recognize, by electrically connecting the antenna coil to the metalization layer, as opposed to the integrated circuit, machinery can be more readily utilized and the manufacturing process can be more fully automated. Further, by electrically connecting the integrated circuit to the metalization layer, without having to attach the integrated circuit directly to the antenna coil leads, it becomes easier and less expensive to customize the PIT tags by permitting the substitution of different integrated circuits and/or capacitors on the metalization layer, thereby permitting customized PIT tags to be manufactured more easily.

Further, the unitary core of the present invention permits a larger volume of core material to be used in a standard-sized PIT tag, or any size of PIT tag for that matter. As one of skill in the art will recognize, one of the factors affecting the strength of an electromagnetic field is the size and material of the core. By increasing the amount of core material in the PIT tag, without increasing the overall size of the PIT tag, the PIT tag of the present invention provides for greater strength of the magnetic filed of the antenna coil, thereby increasing the operational range of the PIT tag.

Further, as one of skill in the art will recognize, by utilizing a unitary core design as described herein, the PIT tag may be able to sustain more shock and vibration than conventional PIT tags because the flattened portion of the core physically supports the integrated circuit and/or capacitor.

Further, as one of skill in the art will recognize, by utilizing a unitary core design as described herein, the integrated circuit used in the PIT tag can be of the flip-chip technology with a surface mounting capacitor connected with conductive glue and cured with heat, or with conventional soldering, or any other art-recognized method.

Other objects and features of the present invention will become apparent from the following detailed description considering conjunction with the accompanying drawing figures. It is to be understood, however, that the drawings, which are not to scale, are designed solely for the purpose of illustration and not as a definition of the limits of the invention, for which reference should be made to the appended claims.

DESCRIPTION OF THE DRAWING FIGURE

In the drawing figures, which are not to scale, and which are merely illustrative, and wherein like reference numerals depict like elements throughout the several views:

FIG. 8 is a top plan view of an assembled PIT tag in accordance with the present invention;

FIG. 9A is a front elevational view of the PIT tag of FIG. 8;

FIG. 9B is a right side elevational view of the PIT tag of FIG. 9A;

FIG 10 is a bottom plan view of the PIT tag of FIG. 8;

DETAILED DESCRIPTION OF THE PREFERRED EMBODIMENTS

Figure 1:
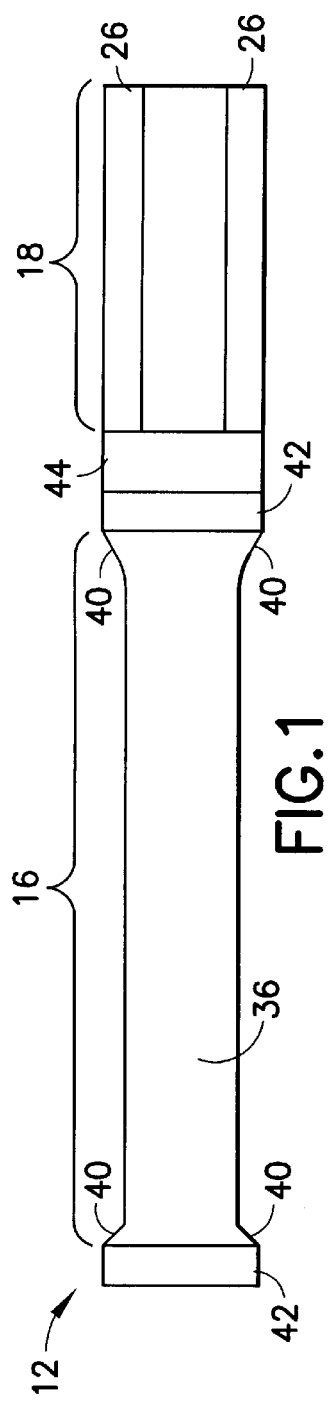
FIG. 1 is a top plan view of a unitary core for use in a PIT tag in accordance with the present invention.
Figure 2A:
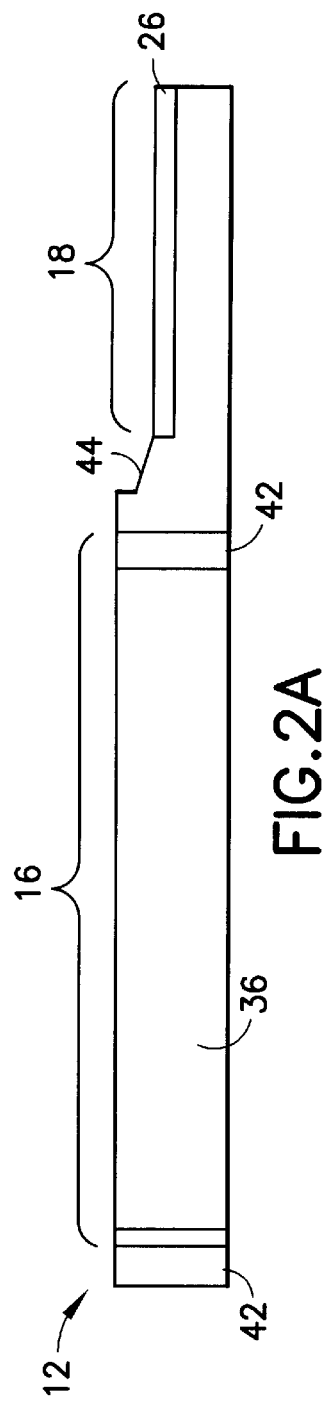
FIG. 2A is a front elevational view of the unitary core of FIG. 1.
Figure 2B:
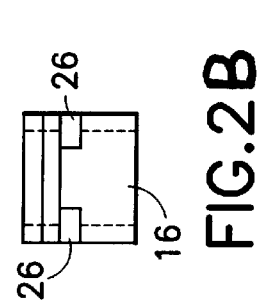
FIG. 2B is a right side elevational view of the unitary core of FIG. 2A.
Figure 3:
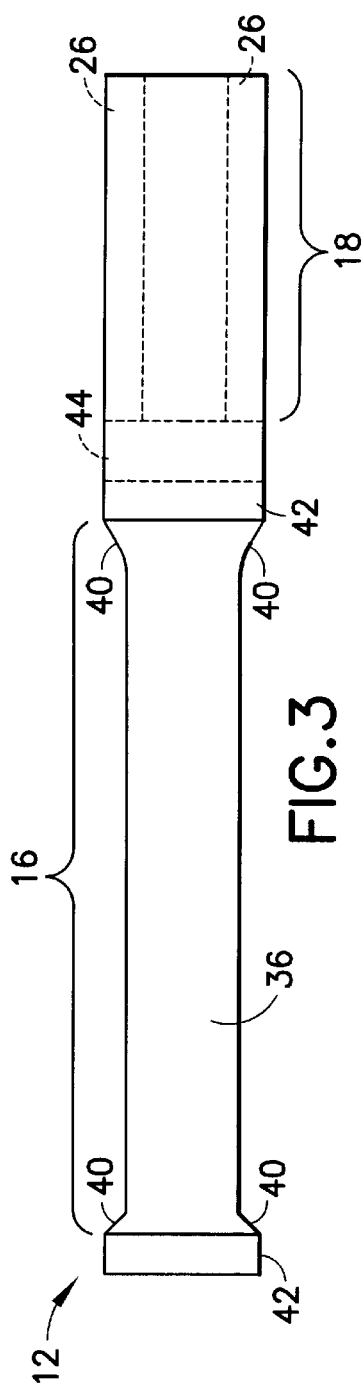
FIG. 3 is a bottom plain view of the unitary core of FIG. 1.

With initial reference to FIGS. 1–3, there is depicted a unitary core, generally depicted as 12, in accordance with the present invention. As seen in FIGS. 1–3, the unitary core of the present invention generally comprises a coil-forming portion 16 at one end of the core, and an integrated circuit support portion 18 at the other end of the core. The core forming portion 16 generally comprises a center portion 36 having beveled ends 40 leading to end portions 42. As seen in FIG. 1, center portion 36 is of generally reduced diameter than end portions 42 so as to accommodate the coil 20 as described below. However, other shaped coil forming portions are envisioned, as a matter of design choice, without departing from the spirit of the invention. Between the coil-forming portion 16 and the integrated circuit support portion 18, there is a transition portion 44. While transition portion 44 is depicted as a sloped surface, other shaped portions are envisioned, as a matter of design choice, without departing from the spirit of the invention. In fact, transition portion 44 is not essential to the design of unitary core 12 and therefore unitary core 12 could be constructed without a transition portion without departing from the spirit of the invention, although it is preferred that the overall height of the core and IC be kept at a minimum to keep the PIT tag small.

In a preferred embodiment, as best seen in FIGS. 2A and 2B, integrated circuit support portion 18 comprises a flattened plane having a lesser height than that of coil forming portion 16, so as to accommodate the installation of the other components of the PIT tag without increasing the overall size of the PIT tag. While integrated support portion 18 is depicted as a flattened plane, other shapes or configurations are envisioned without departing from the spirit of the invention, as a matter of application specific design choice. That is, other shapes of the integrated support portion 18 are envisioned so long as the overall height of the PIT tag remains within an acceptable range for use in an implantable PIT tags.

In a preferred embodiment, integrated support portion 18 comprises metalization layers 26. Metalization layers 26 are formed of an art-recognized material having the necessary conductive properties to accomplish the objectives of the present invention and, in a preferred embodiment, the metalization layers 26 are formed of silver. Other precious metals, such as gold, are also envisioned and believed to be usable as a matter of application specific design choice. As one of skill in the art will recognize, and as described more fully below, the metalization layers 26 serve as the electrical connection between the antenna 20, integrated circuit 14 and capacitor 28. In a preferred embodiment, metalization layers 26 are deposited on integrated circuit support portion 18 in an art recognized deposition technique. However, metalization layers 26 could be otherwise mounted on or formed on, or in, or as a part of, integrated circuit support portion 18 as a matter of design choice without departing from the spirit of the invention. Further, while metalization layers 26 are depicted as extending only a portion of the length of integrated circuit support portion 18, the actual length or shape of the layers is not an essential aspect of the present invention. For example, the metalization layers 26 could be formed as a plate or any other shape and size, as a matter of design choice, without departing from the spirit of the invention.

In a preferred embodiment, the unitary core 12 is formed of a ferrite, and, in particular, high temperature ferrite. High temperature ferrite may or may not be necessary, as a matter of design choice, depending on how metalization layers 26 are deposited on, or formed on or in integrated circuit support portion 18. Further, while ferrite is envisioned as a preferred core material of the present invention, other are-recognized core materials now known or available in the future are envisioned without departing from the spirit of the invention.

Many of the other main components of a conventional Passive Integrated Transponder (PIT) tag are depicted in FIGS. 4–7. As used herein the terms Passive Integrated Transponder tags and/or PIT tags are used synonymously and are intended to mean any type of passive transponder which emits a signal in response to exposure to a radiated electromagnetic, electrical or magnetic energy field. Such tags are commonly subcutaneously embedded in animals for the purpose of tracking and identifying them in such locations as zoos and farms, or in the wild. Such tags are also used for tagging fish and birds, as well as domestic pets. As is known in the art, and as will become evident from a further reading of the material below, systems such as the one described herein, may be deployed in numerous applications and situations limited only by the imagination of the person of skill in the art. The unitary core of the present invention may therefor be used in any application wherein transponders are placed on objects for tracking such objects as they pass within or through the field of a bi-directional antenna which energizes the transponder and receives identifying signals therefrom. As used herein, the terms object and item are used interchangeably and mean any PIT tagged entity, animate or inanimate.

Figure 4:
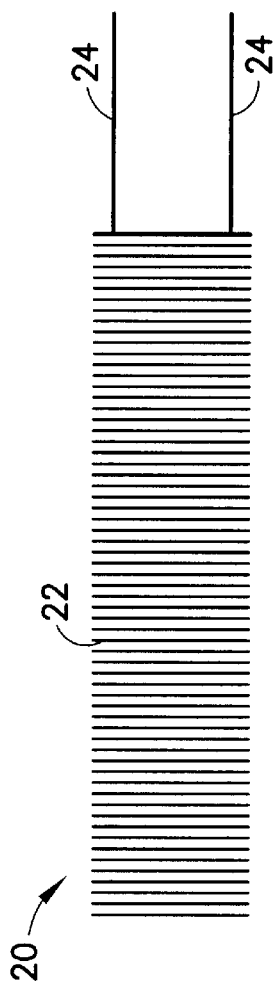
FIG. 4 is a top plan view of an antenna for use with the unitary core of the present invention.
Figure 6:
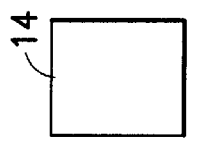
FIG. 6 is a top plan view of an integrated circuit for use with the unitary core of the present invention.
Figure 5:
FIG. 5 is a top plan view of a capacitor for use with the unitary core of the present invention.

FIG. 4 depicts a conventional antenna, generally indicated as 20, comprising a coil portion 22 and lead portions 24. Antennae for use in PIT tags are well known in the art. The particular wire used, or the number of turns in coil portion 22, is not an essential feature of the present invention. That is, the present invention envisions the use of any art recognized antenna wire, having the necessary number of turns, to accomplish the desired application specific features of the particular PIT tag required. FIG. 5 depicts a capacitor, which, as described later, may or may not form a part of the invention depending in part on the specific integrated circuit utilized in the PIT tag. FIG. 6 depicts an integrated circuit 14. Integrated circuits are well known in the art and, like capacitor 28, the particular integrated circuit 14 used in the present invention can be selected as a matter of design choice, depending on the particular characteristics or features desired in the PIT tag. In a preferred embodiment, integrated circuit 14 is an ISO 11'784/11'785 Compliant Read-Only Contactless Identification Device sold by E.M. Micro Electronic—Marrin S.A. under the item number H 4005. The particular characteristics and features of the preferred integrated circuit 14 are described in E.M. Micro Electronic—Marrin S.A.'s Integrated Circuit's product catalog under the item number H 4005, which is hereby incorporated by reference. As explained in greater detail in the product catalogue, the preferred integrated circuit 14 comprises an on-chip resonance capacitor and on-chip supply buffer capacitor, which therefore may eliminate the need for capacitor 28 as depicted in the Figures herein. Furthermore, as explained in greater detail in the product catalogue, the preferred integrated circuit 14 comprises bumps for permitting an electrical connection between the integrated circuit and the metalization layers 26 of the present invention.

Figure 7:
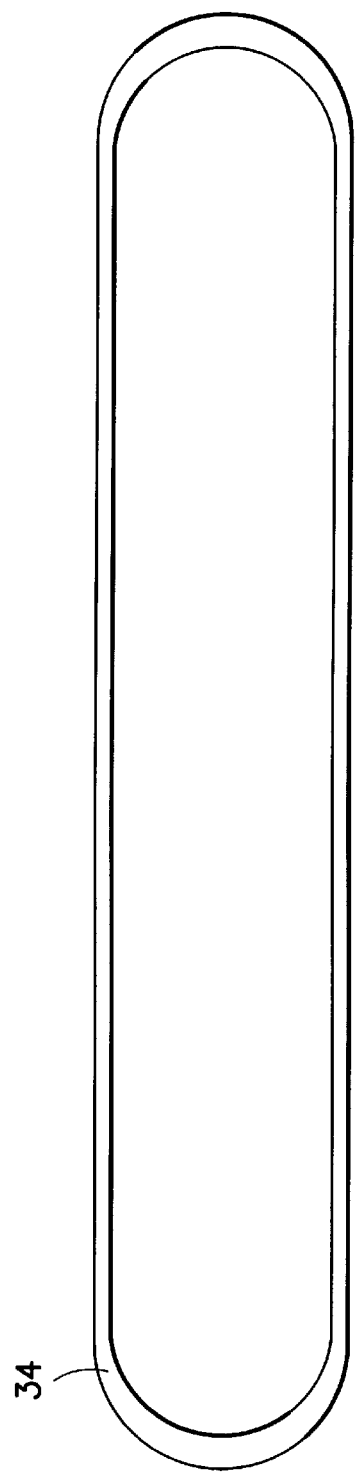
FIG. 7 is a top plan view of an encapsulating means for use with the unitary core of the present invention.

FIG. 7 depicts an encapsulation means 34. In a preferred embodiment, encapsulation means 34 is formed of glass. However, as a matter of design choice, any other art recognized non-porous, corrosion-resistant material that is amenable to sterilization could be used as the encapsulation means 34 without departing from the spirit of the invention. Glass encapsulation of transponders is within the skill of the art, as described for example in U.S. Pat. No. 3,935,612 to Fisher et al., which is hereby incorporated by reference.

FIGS. 8–10 depict an encapsulated PIT tag having a unitary core constructed in accordance with a preferred embodiment of the present invention. As seen in FIGS. 8–10, coil portion 22 of coil 20 is wound about coil-forming portion 16 of the unitary core 12, with the lead portions 24 extending from the coil portion in a direction towards the integrated circuit support portion 18 of unitary core 12. The lead portions 24 terminate and are electrically connected to the metalization layers 26 in an art-recognized manner. Further, the capacitor 28, if required, as well as the integrated circuit 14 are mounted and/or electrically connected to the metalization layers 26. While capacitor 28 is depicted in the Figures, as described above, the need for a capacitor may be eliminated, as a matter of design choice, depending on the particular integrated circuit chosen. In a preferred embodiment, as described above, the bumps on the preferred integrated circuit provide for the electrical connection between the integrated circuit 14 and metalization layers 26. Other art-recognized methods or means for electrically connecting the integrated circuit and/or the capacitor to the metalization layers are envisioned without departing from the spirit of the invention.

As best seen in FIGS. 9A and 9B, the integrated circuit support portion 18 of unitary core 12 extends beneath and supports the capacitor 28 and integrated circuit 14. Further, because the integrated circuit support portion 18 is formed with a reduced height (as compared with the coil forming portion 16) the overall height of the PIT tag need not be increased when the integrated circuit 14 and/or capacitor 28 are mounted on the integrated circuit support portion 18 of unitary core 12. Also, as seen in FIGS. 8–10, in a preferred embodiment unitary core 12 extends substantially the entire length of the interior of encapsulation means 34.

Figure 11:
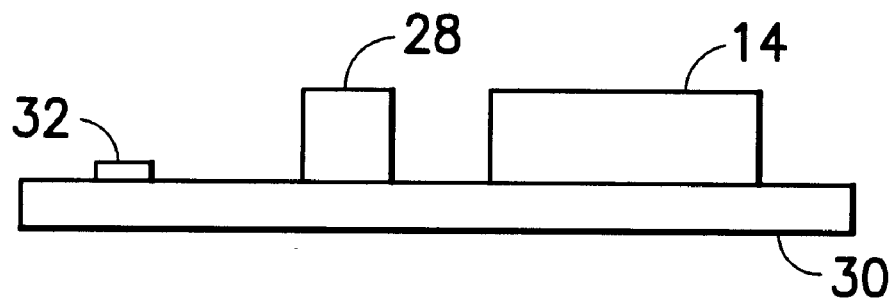
FIG. 11 is a front elevational view of a Printed Circuit Board (PCB) having a capacitor and integrated circuit mounted thereon in accordance with the present invention.
Figure 12:
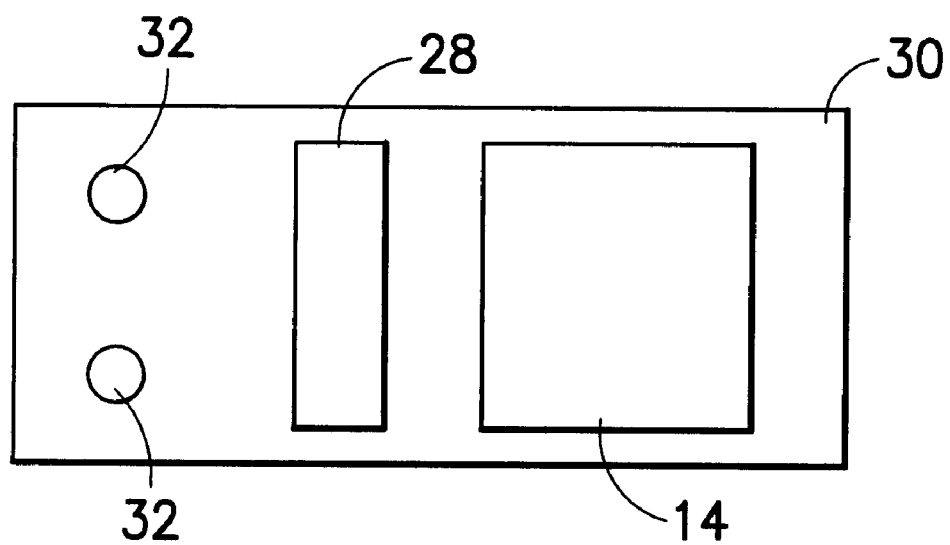
FIG. 12 is a top plan view of the PCB of FIG. 11.

In an alternate embodiment (not shown), unitary core 12 is constructed in a similar manner as described above, but metalization layers 26 are not used. Instead, in the alternate embodiment, a Printed Circuit Board (PCB) 30 is used to electrically connect the antenna leads 24, capacitor 28 and integrated circuit 14. As seen in FIGS. 11 and 12, the PCB comprises electrical pads 32 to electrically connect the antenna leads 24 of the antenna coil 20 to both the capacitor 28 an integrated circuit 14, in a manner well known in the art. While the use of pads 32 are depicted, other art-recognized methods or means of electrically connecting antenna leads 24 to PCB 30 are envisioned without departing from the spirit of the invention. In this alternate embodiment, the PCB 30 is mounted on integrated circuit support portion 18 of unitary core 12. Thus, as with the previous embodiment disclosed, the integrated circuit support portion 18 of the unitary core 12 would extend beneath and support both the capacitor 28 and integrated circuit 14.

As one of skill in the art will recognize, the unitary core 12 of the present invention offers many advantages over prior art PIT tag cores. For example, by terminating the antenna lead 24 to the metalization layers 26, the manufacturing process could be more fully automated. Further, by electrically connecting the integrated circuit 14 to the metalization layers 26, without having to attach the integrated circuit 14 directly to the antenna leads 24, it becomes easier and less expensive to customize the PIT tags by permitting the substitution of different integrated circuits and/or capacitors on the metalization layer, thereby permitting customized PIT tags to be manufactured more easily.

Further, as one of skill in the art will recognize, the unitary core of the present invention permits a larger volume of core material to be used in a standard sized PIT tag. As one of skill in the art will recognize, one of the factors effecting the strength of an electromagnetic field is the size and material of the core. By increasing the amount of core material in the PIT tag, without increasing the overall size of the PIT tag, the PIT tag of the present invention provides for a greater capture of the magnetic field of the antenna coil, thereby increasing the operational range of the PIT tag. In fact, the applicant determined that the structure of the PIT tag core of the present invention can provide for up to a 50% increase in the operational range of the PIT tag as compared with prior art PIT tags.

Further, as one of skill in the art will recognize, by utilizing the unitary core design as described herein, the PIT tag may be able to sustain more shock and vibration than conventional PIT tags because the integrated circuit support portion 18 physically supports the integrated circuit 14 and/or capacitor 28.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A passive integrated transponder (PIT) tag comprising:
   an integrated circuit and a unitary core;
   said unitary core comprising a coil-forming portion proximate one end thereof and an integrated circuit support portion proximate an opposite end thereof; and
   wherein said integrated circuit support portion extends beneath and supports said integrated circuit.

2. The PIT tag of claim 1, wherein said integrated circuit support portion has a metalization layer formed thereon.

3. The PIT tag of claim 1, wherein said unitary core is formed of a ferrite.

4. The PIT tag of claim 1, further comprising a Printed Circuit Board (PCB) mounted on said integrated circuit support portion.

5. The PIT tag of claim 1, wherein a length of said unitary core substantially defines a length of said PIT tag.

6. The PIT tag of claim 1, further comprising an encapsulation means for encapsulating said PIT tag to form a sealed unit.

7. The PIT tag of claim 2, further comprising:
   an antenna comprising a coil portion wound about said coil-forming portion and lead portions extending from said coil portion and terminating at said integrated circuit support portion.

8. The PIT tag of claim 7, wherein said antenna lead portions terminate at and are electrically connected to said metalization layer.

9. The PIT tag of claim 2, wherein said integrated circuit is electrically connected to said metalization layer.

10. The PIT tag of claim 2, further comprising a capacitor mounted on and electrically connected to said metalization layer.

11. The PIT tag of claim 2, wherein said metalization layer is formed of gold or silver.

12. The PIT tag of claim 4, wherein said antenna leads and said integrated circuit are electrically connected to said PCB.

13. The PIT tag of claim 7, wherein said antenna coil is indirectly electrically connected to said integrated circuit.

14. The PIT tag of claim 13, wherein said unitary core has a length that extends substantially coextensively with a length of said sealed unit.

15. The PIT tag of claim 3, wherein said ferrite is a high temperature ferrite.

16. A unitary core for receiving an antenna coil, comprising:
   a coil receiving portion adapted to receive an antenna coil thereon; and
   an integrated circuit support portion adapted to receive an integrated circuit thereon.

17. The unitary core of claim 16, wherein said integrated circuit support portion further comprises a metalization layer formed thereon.

18. The unitary core of claim 17, wherein said metalization layer is adapted to receive said integrated circuit.

19. The unitary core of claim 18, wherein metalization layer electrically connects said antenna coil and said integrated circuit.

20. The unitary core of claim 17, wherein said metalization layer is formed of gold or silver.

21. The unitary core of claim 16, wherein said integrated circuit support portion is adapted to receive a PCB.

22. The unitary core of claim 16, wherein said core is formed of a ferrite.

23. The unitary core of claim 22, wherein said ferrite is a high temperature ferrite.

* * * * *